(12) United States Patent
Burgunder

(10) Patent No.: US 11,785,343 B2
(45) Date of Patent: Oct. 10, 2023

(54) VISUAL DISPLAY SYSTEM AND METHOD IN AN AIRCRAFT

(71) Applicant: Airbus (S.A.S.), Blagnac (FR)

(72) Inventor: Samuel Burgunder, Blagnac (FR)

(73) Assignee: Airbus (S.A.S.), Blagnac (FR)

( * ) Notice: Subject to any disclaimer, the term of this patent is extended or adjusted under 35 U.S.C. 154(b) by 0 days.

(21) Appl. No.: 17/470,714

(22) Filed: Sep. 9, 2021

(65) Prior Publication Data

US 2022/0086345 A1 Mar. 17, 2022

(30) Foreign Application Priority Data

Sep. 11, 2020 (FR) ...................................... 2009210

(51) Int. Cl.
| | |
|---|---|
| *H04N 5/232* | (2006.01) |
| *H04N 5/247* | (2006.01) |
| *H04N 7/18* | (2006.01) |
| *B64D 43/00* | (2006.01) |
| *B64D 47/08* | (2006.01) |
| *H04N 23/698* | (2023.01) |
| *H04N 23/90* | (2023.01) |

(52) U.S. Cl.
CPC ........... *H04N 23/698* (2023.01); *B64D 43/00* (2013.01); *B64D 47/08* (2013.01); *H04N 7/181* (2013.01); *H04N 23/90* (2023.01)

(58) Field of Classification Search
None
See application file for complete search history.

(56) References Cited

U.S. PATENT DOCUMENTS

| | | | |
|---|---|---|---|
| 7,028,304 B1 * | 4/2006 | Weinberger | H04L 67/12 709/227 |
| 2004/0196378 A1 * | 10/2004 | Kannermark | H04N 23/665 348/207.99 |
| 2016/0027335 A1 * | 1/2016 | Schoensee | G09B 19/165 434/35 |
| 2016/0381412 A1 * | 12/2016 | Couleaud | H04N 21/4223 725/46 |
| 2018/0127111 A1 * | 5/2018 | Feyereisen | G01C 23/00 |
| 2020/0314333 A1 * | 10/2020 | Liang | G06V 20/56 |
| 2021/0352335 A1 * | 11/2021 | Watson | H04N 21/2187 |
| 2021/0383709 A1 * | 12/2021 | Perrin | G08G 5/025 |

FOREIGN PATENT DOCUMENTS

| | | | |
|---|---|---|---|
| EP | 2 610 590 A2 | 7/2013 | |
| EP | 2610590 A2 * | 7/2013 | ........... G01C 23/005 |
| FR | 3 027 718 A1 | 4/2016 | |
| WO | WO 2013/063392 A1 | 5/2013 | |

OTHER PUBLICATIONS

French Search Report for Application No. 2009210 dated Feb. 25, 2021.

\* cited by examiner

*Primary Examiner* — Edemio Navas, Jr.
(74) *Attorney, Agent, or Firm* — KDW Firm PLLC

(57) ABSTRACT

A system and method benefiting from cameras and digital hardware already installed on an aircraft in order to manage the images in the best possible manner according to the different flight phases. The visual display system in an aircraft includes a vision device to acquire a current image stream around the aircraft, and a processor to retrieve the current image stream from the vision device and to launch a current viewing application around the aircraft which is compatible with the current mobility phase of the aircraft.

12 Claims, 3 Drawing Sheets

VISUAL DISPLAY SYSTEM AND METHOD IN AN AIRCRAFT

CROSS-REFERENCE TO RELATED APPLICATION

This application claims priority to French patent application number 20 09210 filed on Sep. 11, 2020, the entire disclosure of which is incorporated by reference herein.

TECHNICAL FIELD

The disclosure herein relates to the field of visual camera displays in an aircraft and, more particularly, for continuous viewing around the aircraft.

BACKGROUND

Aircraft are currently equipped with cameras to improve pilot visibility and, in particular, on airport runways.

Moreover, aircraft and, in particular, air liners are designed with small windows in the cabins to allow passengers to see outside the airplane. However, these windows only allow very limited visibility of the outside of the aircraft. Moreover, only passengers with window seats have an outside view.

In order to solve this problem, there are proposals for the use of cameras already installed on the aircraft to allow passengers to have an outside view.

However, the images for passengers require specific digital processing and additional computers increase the weight of the aircraft and costs.

Consequently, an object of the disclosure herein is a visual display system and method which overcomes the aforementioned disadvantages, in particular allowing an optimum visual display by using the cameras already installed on the aircraft in an effective manner.

SUMMARY

The disclosure herein is defined by a visual display system in an aircraft comprising:
  a vision device configured to acquire a current image stream around the aircraft; and
  a processor configured to retrieve the current image stream from the vision device and to launch a current viewing application around the aircraft which is compatible with the current mobility phase of the aircraft.

This system comprises an ingenious combination of the vision device and the processor, thereby creating a synergy which allows the image stream to be managed according to different viewing applications and different flight phases using a single processor.

Advantageously, the processor is configured to determine the current mobility phase of the aircraft from input data relating to at least one parameter representing the state of the aircraft.

This enables the processor to have precise knowledge of the state of the aircraft, so that it can select the viewing application to be implemented depending on the flight phase.

The input data are advantageously chosen from amongst data comprising data representing the speed of the aircraft, data representing the weight on wheels of the landing gear, GPS data, data relating to the altitude of the aircraft, navigation system data, data relating to the rotation speed of the engine, data relating to the outside pressure, data relating to the outside temperature, data relating to the fuel flow rate, data relating to the air flow rate acquired inside the engine, data relating to the electrical energy acquired inside the engine, data relating to the position of the ailerons.

Hence, the processor can use different data sources according to the availability of these data and the processor can retrieve data from different sources where necessary, so that the state of the aircraft can be reliably determined.

The current viewing application advantageously uses at least a portion of the current image stream and is selected from among a set of predetermined live viewing applications comprising: first applications associated with different mobility phases, second applications associated with a cruising flight phase, third applications associated with a taxiing phase, fourth applications associated with a take-off and landing phase, fifth applications associated with a stopping phase.

Hence, the same hardware capabilities allow viewing applications of interest to be used in different ways at different mobility phases of the aircraft.

According to one embodiment of the disclosure herein, the first applications comprise a surveillance application for pilots, the second applications comprising a 360° live viewing application around the aircraft dedicated to passengers, the third applications comprising a taxiing surveillance application for pilots, the fourth applications comprising a take-off and landing application, the fifth applications comprising surveillance applications of ground operations.

This enables the images to be put to the best possible use according to the specificity of each application.

The cockpit advantageously comprises a control tool configured to allow the pilot to force the stopping or starting of a viewing application.

In this way, the pilot is always in control of the different applications.

The processor is advantageously configured to allow the recording of all or part of the image stream in a memory.

Hence, the recorded images can always be used subsequently, in case of an incident for example.

The vision device advantageously comprises a set of cameras configured to acquire current images around the aircraft and a multiplexer configured to form at least one current image stream from the current images retrieved from the set of cameras before transmitting them to the processor.

The different cameras are advantageously disposed in an adapted manner to form overlapping view zones generating an immersive 360° view around the aircraft.

The disclosure herein is likewise aimed at a visual display method in an aircraft comprising the following stages:
  acquiring a current image stream around the aircraft; and
  launching a current viewing application around the aircraft which is compatible with the current mobility phase of the aircraft.

Other advantages and features of the disclosure herein will appear in the non-limiting detailed description of the embodiments below.

BRIEF DESCRIPTION OF THE DRAWINGS

A description of embodiments of the disclosure herein will now be provided by way of non-limiting examples, making reference to the attached drawings in which.

DETAILED DESCRIPTION

The concept on which the disclosure herein is based is that of benefiting from cameras and digital hardware already installed on the aircraft, in order to manage the images in the best possible manner according to the different flight phases.

Figure 1:
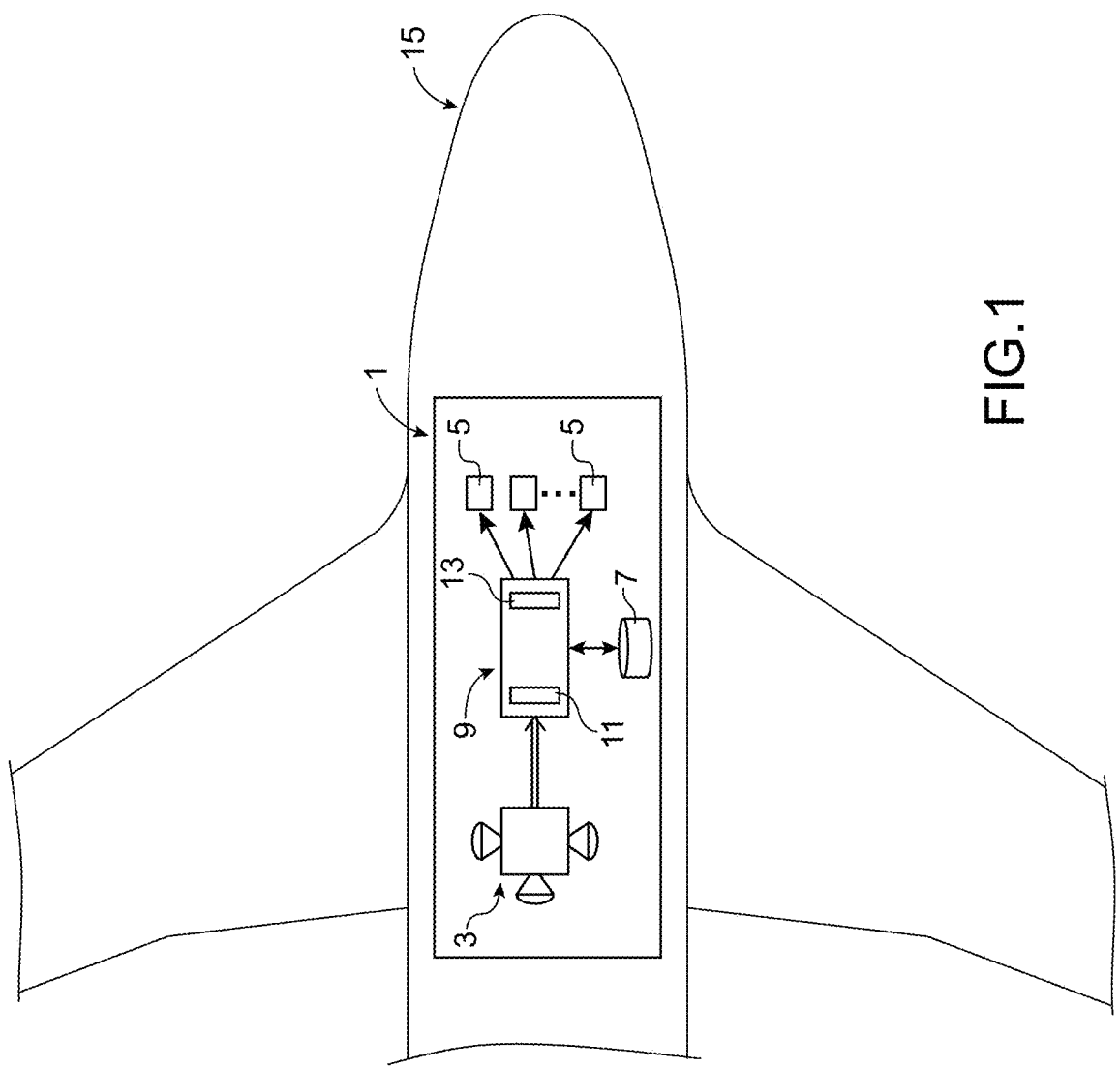
FIG. 1 illustrates schematically a visual display system in an aircraft according to an embodiment of the disclosure herein.

FIG. 1 illustrates schematically a visual display system in an aircraft, according to an embodiment of the disclosure herein.

This visual display system 1 comprises a vision device 3, graphics interfaces 5, memories 7 and a processor 9 for data-processing comprising input interfaces 11 and output interfaces 13.

The vision device 3 is configured to acquire a current image stream (i.e. video stream) around the aircraft 15. Moreover, the processor 9 is configured to retrieve the stream of current images from the vision device 3. In addition, the processor 9 is configured to use at least a portion of the current image stream, in order to launch a current viewing application around the aircraft 15 which is compatible with the current mobility phase (i.e. taxiing, flight or parking) of the aircraft 15. The images associated with the current viewing application are transmitted by the processor 9 to at least a portion of the graphics interfaces 5 where they are displayed live.

Hence, this system allows a single processor 9 to be used to manage the incoming image stream and to attribute it, depending on each flight phase, to a specific application from among a set of predetermined applications. The processor 9 thereby allows triggering of the viewing tasks to be carried out according to each flight phase.

Figure 2:
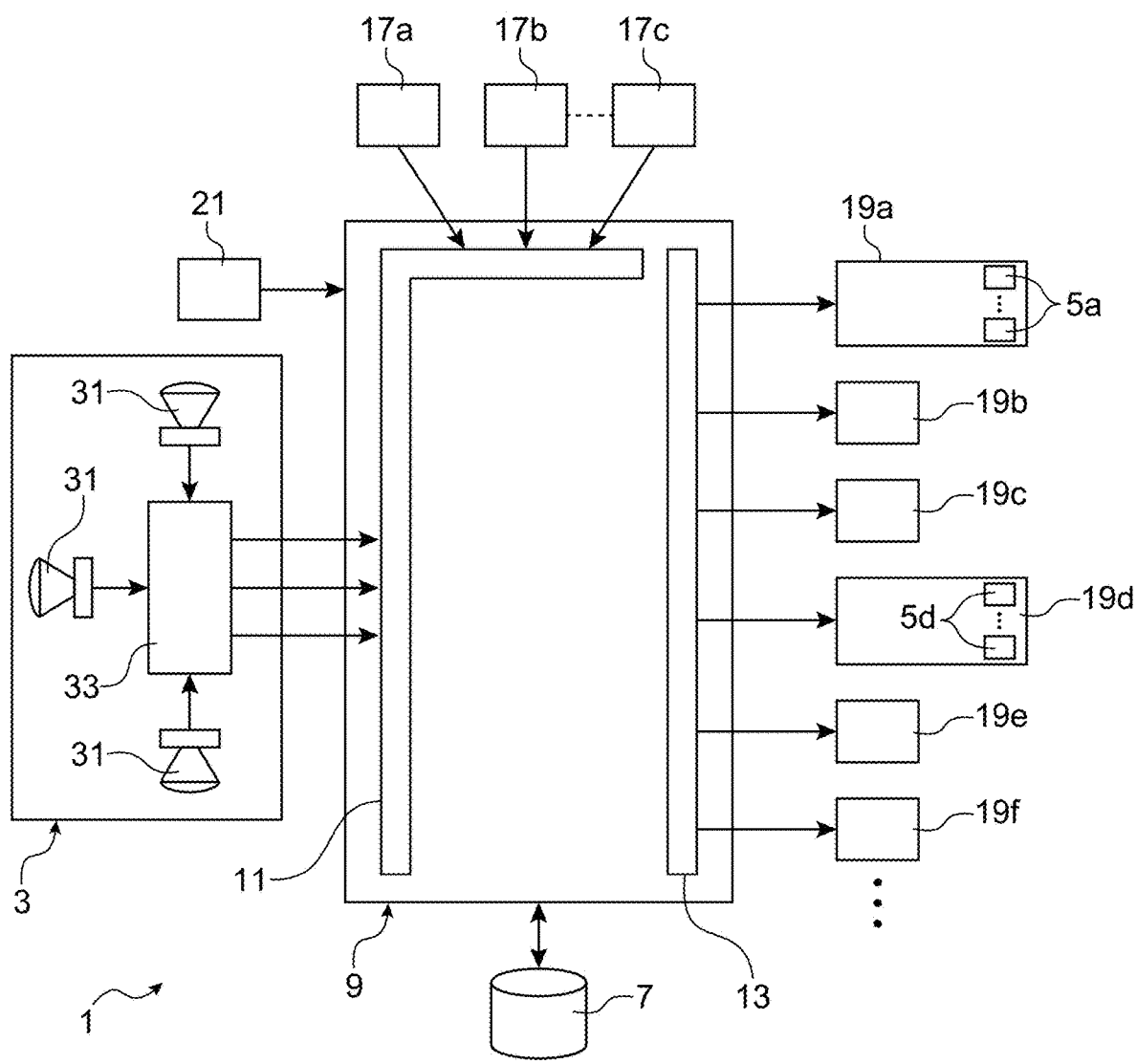
FIG. 2 illustrates schematically architecture of the visual display system in an aircraft, according to an embodiment of the disclosure herein.

FIG. 2 illustrates schematically architecture of the visual display system in an aircraft, according to an embodiment of the disclosure herein.

This architecture illustrates the connection via a wired and/or wireless connection network of the aircraft 15 between the processor 9, on the one hand, and the vision device 3, on the other, as well as other elements or modules 17, 19 of the aircraft 15.

The vision device 3 comprises a set of cameras 31 and a multiplexer 33. The multiplexer 33 is connected to the set of cameras 31 and configured to form one, or multiple, current image streams 21 from current images retrieved from the set of cameras 31. The image stream or streams 21 formed by the multiplexer 33 is (are) transmitted to the processor 9.

More particularly, the input interfaces 11 of the processor 9 are connected to the vision device 3 to receive the image stream 21 there. The input interfaces 11 are likewise connected to a set of modules 17 of the aircraft 15 comprising, by way of example, a GPS 17a, at least one module 17b indicating the flight phase (for example landing gear, on-board computer, altimeter, etc.), cockpit control and management modules 17c, etc.

The output interfaces 13 are connected to an IFE (In-Flight Entertainment) system 19a comprising graphics screens or interfaces 5a, an immersive reality system 19b, a cabin Wifi system 19c, a cockpit Wifi system 19d connected to graphics interfaces 5d of the cockpit, a video surveillance system 19e, a maintenance system 19f, etc.

Moreover, the processor 9 is connected to an electrical power source 21, as well as to memories 7.

The processor 9 is configured to determine the current mobility phase of the aircraft 15 from input data received via its input interfaces 11. These input data relate to at least one representative parameter of the state of the aircraft 15 acquired from at least one indicator module 17 of the phase of the flight from among the set of modules 17a-17c of the aircraft 15 connected to the input interfaces 11. It will be noted that at least a portion of the input data may be available in a database.

By way of example, the input data are chosen from among data comprising data representing the speed of the aircraft, data representing the state of the landing gear, GPS data, data relating to the altitude of the aircraft, etc. For example, when input data is received indicating that the landing gear is stowed away, the processor 9 deduces that the aircraft 15 is in flight. By contrast, when input data is received indicating that the landing gear is down, the processor 9 deduces that the aircraft 15 is either in take-off phase or in landing phase or in taxiing or parking phase. In this case, the processor 9 can cross-check this data with other data, such as the wheel speed, for example, and/or the weight on wheels and/or the position of the ailerons, in order to reliably determine the state of mobility of the aircraft 15.

According to other examples, the input data indicating the state of the aircraft may comprise data relating to the navigation system, data concerning the engine rotation speed, data relating to the outside pressure and/or the outside temperature, data relating to the fuel flow rate, data relating to the air flow rate acquired within the engine, data relating to the electrical energy acquired within the engine, data relating to the position of the blades, etc.

Figure 3:
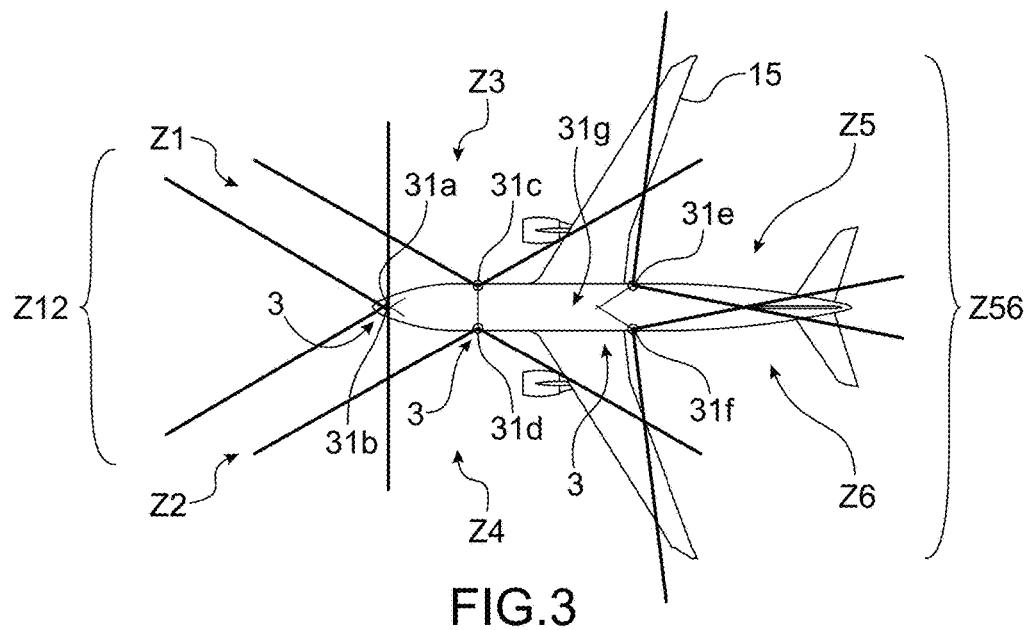
FIG. 3 illustrates schematically a vision device in an aircraft, according to an embodiment of the disclosure herein.

FIG. 3 illustrates schematically the installation of a vision device in an aircraft, according to an embodiment of the disclosure herein.

The vision device 3 comprises a multiplexer 33 (see FIG. 2), as well as a set of cameras 31 comprising seven cameras 31a-31g, for example, installed on the inside and on the outside of the aircraft 15 and pointing towards the outside to capture images around the aircraft 15. It will be noted that the cameras installed on the outside of the aircraft 15 are pressurized and well protected.

According to one embodiment, first and second cameras 31a, 31b are positioned on the inside of the cockpit to capture an image stream of the first Z1 and second Z2 zones in front of the aircraft 15, Third and fourth cameras 31c, 31d are positioned on the inside of the front section of the cabin on opposite sides to capture image streams on the outside of lateral zones Z3, Z4 of the aircraft 15. Fifth and sixth cameras 31e, 31f are positioned on the outside in rear lateral portions of the ventral fairing 15 on opposite sides to capture image streams relating to rear zones Z5, Z6 of the aircraft 15. A seventh camera 31g is positioned on the outside in the lower part of the ventral fairing of the aircraft to capture image streams in a zone below the aircraft 15.

Advantageously, the different cameras 31a-31g are disposed in such a manner that overlapping zones are formed. In effect, the first zone Z1 and second zone Z2 overlap to form a front zone Z12 wide enough to cover a global view in front of the aircraft 15. The rear zones Z5, Z6 overlap to form a rear zone Z56 wide enough to cover a global rear view of the aircraft 15. Finally, all the zones Z12, Z3, Z4, Z56, in addition to the zone below the aircraft, overlap to generate an immersive 360° view around the aircraft 15, as well as other external views adapted to specific applications.

Hence, the different cameras 31a-31g are configured to acquire current 360° images around the aircraft 15. In addition, the multiplexer 33 recovers the images from different cameras 31a-31g to form streams of current images before transmitting them to the processor 9.

Advantageously, the processor 9 is configured to allow the recording of all or some part of the image stream in the memories 7. This recording may be automatic and/or at the request of the pilot.

Figure 4:
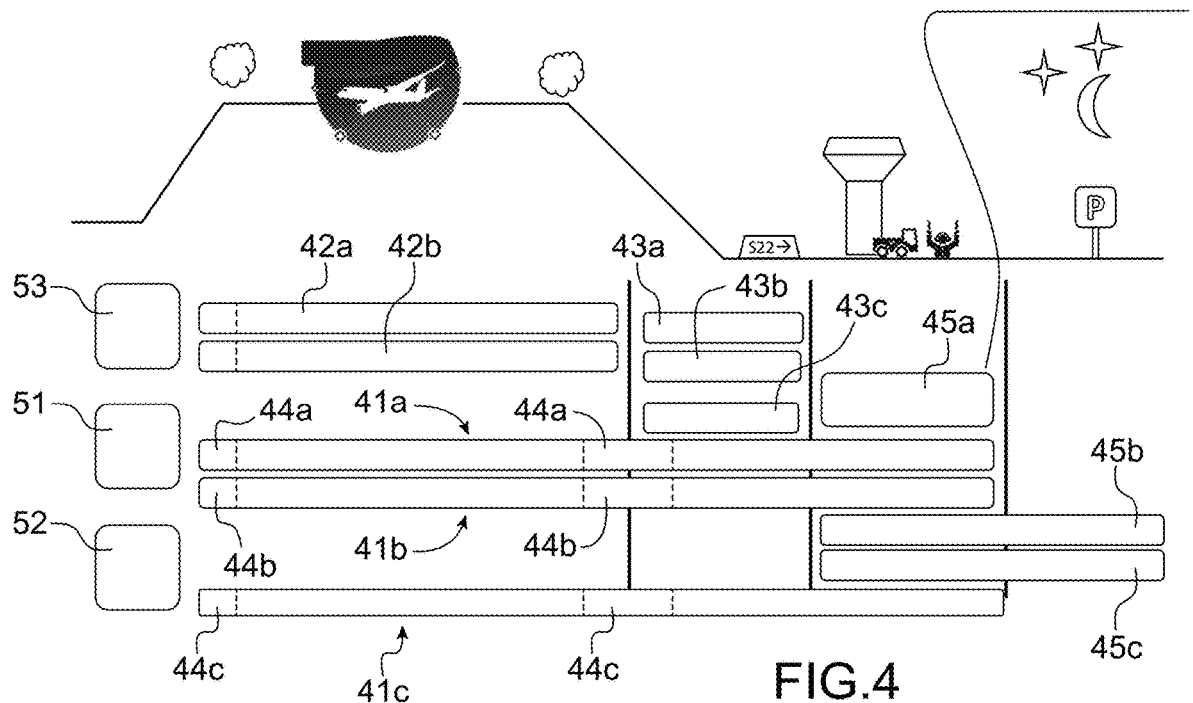
FIG. 4 illustrates schematically sequences of viewing applications around the aircraft depending on the state of the aircraft, according to an embodiment of the disclosure herein.

FIG. 4 illustrates schematically viewing application sequences around the aircraft depending on the state of the aircraft, according to an embodiment of the disclosure herein.

By retrieving the current image flow or flows from the vision device 3, as well as the input data indicating the current mobility phase of the aircraft 15, the processor 9 (see FIG. 2) launches a current viewing application around the aircraft depending on the current mobility phase of the aircraft 15.

The current viewing application uses at least a portion of the current image flow and is selected from among a set of predetermined live viewing applications, the software configuration of which is recorded in the memories 7 of the visual display system 1.

By way of example, the set of predetermined viewing applications comprises; first applications 41a, 41b, 41c associated with different flight phases, second applications 42a, 42b associated with a cruising flight phase, third applications 43a, 43b, 43c associated with a taxiing phase, fourth applications 44a, 44b, 44c associated with take-off and landing phases and fifth applications 45a, 45b, 45c when the aircraft 15 is at a standstill or parked. The different viewing applications do not work at the same time. They operate at different times, depending on the action of the aircraft 15.

The first applications 41a, 41b, 41c comprise a surveillance viewing application for pilots 51 which can be activated in any of the phases. For example, in the flight phase pilots 51 can check on the state of the engines. The first applications may likewise include an application 41c indicating the view of the pilots, thanks to a camera installed in the cockpit.

The cameras are advantageously equipped with a dashcam system which involves recording a predefined time lapse (generally 2 minutes) of the video stream in a random access memory. If an incident should take place, the pilot can ask to record these sequences from all or some of the cameras on a hard disk. In addition, the pilot has the option of selecting the flow coming from at least one camera from among the set of cameras.

The second applications 42a, 42b comprise a live viewing application around the aircraft 15 transmitted to the inflight entertainment (IFE) system and a 360° live viewing application dedicated to passengers 53. Hence, the passengers 53 can have an immersive view all around the aircraft 15. These viewing applications for passengers 53 may be linked to a database comprising points of interest with their GPS coordinates.

The third applications 43a, 43b, 43c comprise a taxiing surveillance application for pilots 51. This surveillance application may be used as a playback system for signals 43a, for collision avoidance 43b and for line-following 43c on the runway, etc.

The fourth applications 44a, 44b, 44c comprise autonomous take-off and landing applications which allow pilots to monitor all the sensitive elements during the take-off or landing of the aircraft 15.

The fifth applications 45a, 45b, 45c comprise surveillance applications of ground operations, such as security applications 45a, video protection applications 45b or facial recognition applications 45c. This makes it possible, for example, to detect undesirable elements in the vicinity of the aircraft, to ensure that the area around the aircraft is empty before starting up the engines, etc., then to communicate this to the pilot 51 or to a person in charge 52, such as the airline or an airport manager.

It should be noted that multiple applications can operate in the same flight phase. This means that it is possible to have a 360° view for the passenger at the same time as a view of only the external structural parts of the aircraft, such as the engines, for the pilot. The multiplexer thereby allows the camera flows to be duplicated and adapted to the applications.

The cockpit advantageously comprises a control tool configured to allow the pilot 51 to force the stopping or starting of a viewing application. Moreover, the control tool is configured to stop, or force the recording of, a video flow in the non-volatile memory.

Hence, the disclosure herein allows the processor 3 to receive different data from the cameras and to analyze it with a view to generating different functions by breaking down the applications according to the flight phase.

For example, while cruising, a passenger 53 can see the surroundings of the aircraft on her or his screen. On landing, the passenger is focused on disembarking which allows the viewing application for passengers 53 to be deactivated and the processor 3 used for another task. In fact, the processor can be used to activate the viewing application which enables the pilot 51 to be assisted in driving the aircraft 15 on the ground thanks to sign recognition, the collision avoidance system, etc, Once at the disembarkation door, the pilot 51 no longer requires assistance and, consequently, the latter application is deactivated so that the processor 3 can be used to monitor ground operations. Finally, once parked, the surveillance of around operations is no longer necessary, and the aircraft protection application is activated. In this case, the cameras are used to detect any intruder, for example.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A visual display system in an aircraft, the system comprising:
    a vision device comprising:
        a set of cameras, each camera being configured to acquire current images of surroundings of the aircraft; and
        a multiplexer configured to form at least one current image stream from the current images acquired by each camera of the set of cameras; and
    a processor configured to retrieve the at least one current image stream from the vision device and launch a current viewing application of the surroundings of the aircraft, the current viewing application being compatible with a current mobility phase of the aircraft and selected from among a set of predetermined live viewing applications comprising:
        first applications associated with different mobility phases, the first applications comprising a surveillance application for pilots;
        second applications associated with a cruising flight phase, the second applications comprising a 360° live viewing application of the surroundings of the aircraft dedicated to passengers;
        third applications associated with a taxiing phase, the third applications comprising a taxiing surveillance application for pilots;
        fourth applications associated with take-off and landing phases, the fourth applications comprising a take-off and landing application; and
        fifth applications associated with a stopping phase, the fifth applications comprising surveillance applications of ground operations;
    wherein the multiplexer is configured to form the at least one current image stream before the at least one current image stream is retrieved by the processor;
    wherein the processor is configured such that multiples of the first, second, third, fourth, and fifth applications can operate during a same flight phase, such that, during the cruising flight phase, the 360° live viewing application of the surroundings of the aircraft can be shown to the passengers through an in-flight entertainment (IFE) system of the aircraft at the same time as the surveillance application is shown to the pilots in a cockpit of the aircraft.

2. The system according to claim 1, wherein the processor is configured to determine, using input data, the current mobility phase of the aircraft, the input data relating to at least one parameter that corresponds to a state of the aircraft.

3. The system according to claim 2, wherein the input data are advantageously chosen from amongst data comprising:
    data representing speed of the aircraft,
    data representing weight on wheels of the landing gear,
    GPS data,
    data relating to altitude of the aircraft,
    navigation system data,
    data relating to rotation speed of an engine,
    data relating to outside pressure,
    data relating to outside temperature,
    data relating to fuel flow rate,
    data relating to an air flow rate acquired inside the engine,
    data relating to electrical energy acquired inside the engine, and
    data relating to a position of ailerons.

4. The system according to claim 1, wherein the cockpit comprises a control tool configured to allow the pilot to force stopping or starting of a viewing application.

5. The system according to claim 1, wherein the processor is configured to allow recording of all or part of the at least one current image stream in a memory.

6. The system according to claim 1, wherein the cameras of the set of cameras are disposed to form overlapping view zones of the surroundings of the aircraft, such that the at least one current image stream formed by the multiplexer is an immersive 360° view of the surroundings of the aircraft.

7. A visual display method in an aircraft, the method comprising:
    providing a vision device comprising a set of cameras and a multiplexer;
    acquiring, using each camera of the set of cameras, current images of surroundings of the aircraft;
    forming, using the multiplexer, at least one current image stream from the current images acquired by each camera of the set of cameras;
    using a processor for:
        retrieving the at least one current image stream from the vision device; and
        launching a current viewing application around the aircraft which is compatible with a current mobility phase of the aircraft and is selected from among a set of predetermined live viewing applications comprising:
            first applications associated with different mobility phases, the first applications comprising a surveillance application for pilots;
            second applications associated with a cruising flight phase, the second applications comprising a 360° live viewing application of the surroundings of the aircraft dedicated to passengers;
            third applications associated with a taxiing phase, the third applications comprising a taxiing surveillance application for pilots;
            fourth applications associated with take-off and landing phases, the fourth applications comprising a take-off and landing application; and
            fifth applications associated with a stopping phase, the fifth applications comprising surveillance applications of ground operations;
    wherein the multiplexer forms the at least one current image stream before the at least one current image stream is retrieved by the processor; and
    wherein multiples of the first, second, third, fourth, and fifth applications can operate during a same flight phase, such that, during the cruising flight phase, the 360° live viewing application of the surroundings of the aircraft can be shown to the passengers through an in-flight entertainment (IFE) system of the aircraft at the same time as the surveillance application is shown to the pilots in a cockpit of the aircraft.

8. The method according to claim 7, comprising using the processor for determining, using input data, the current mobility phase of the aircraft, the input data relating to at least one parameter that corresponds to a state of the aircraft.

9. The method according to claim 8, wherein the input data are advantageously chosen from amongst data comprising:
- data representing speed of the aircraft,
- data representing weight on wheels of the landing gear,
- GPS data,
- data relating to altitude of the aircraft,
- navigation system data,
- data relating to rotation speed of an engine,
- data relating to outside pressure,
- data relating to outside temperature,
- data relating to fuel flow rate,
- data relating to an air flow rate acquired inside the engine,
- data relating to electrical energy acquired inside the engine, and
- data relating to a position of ailerons.

10. The method according to claim 7, wherein the cockpit comprises a control tool that allows the pilot to force stopping or starting of a viewing application.

11. The method according to claim 7, comprising recording, using the processor, all or part of the at least one current image stream in a memory.

12. The method according to claim 7, wherein the cameras of the set of cameras are disposed to form overlapping view zones of the surroundings of the aircraft, such that the at least one current image stream formed by the multiplexer is an immersive 360° view of the surroundings of the aircraft.

\* \* \* \* \*